Figure 1:
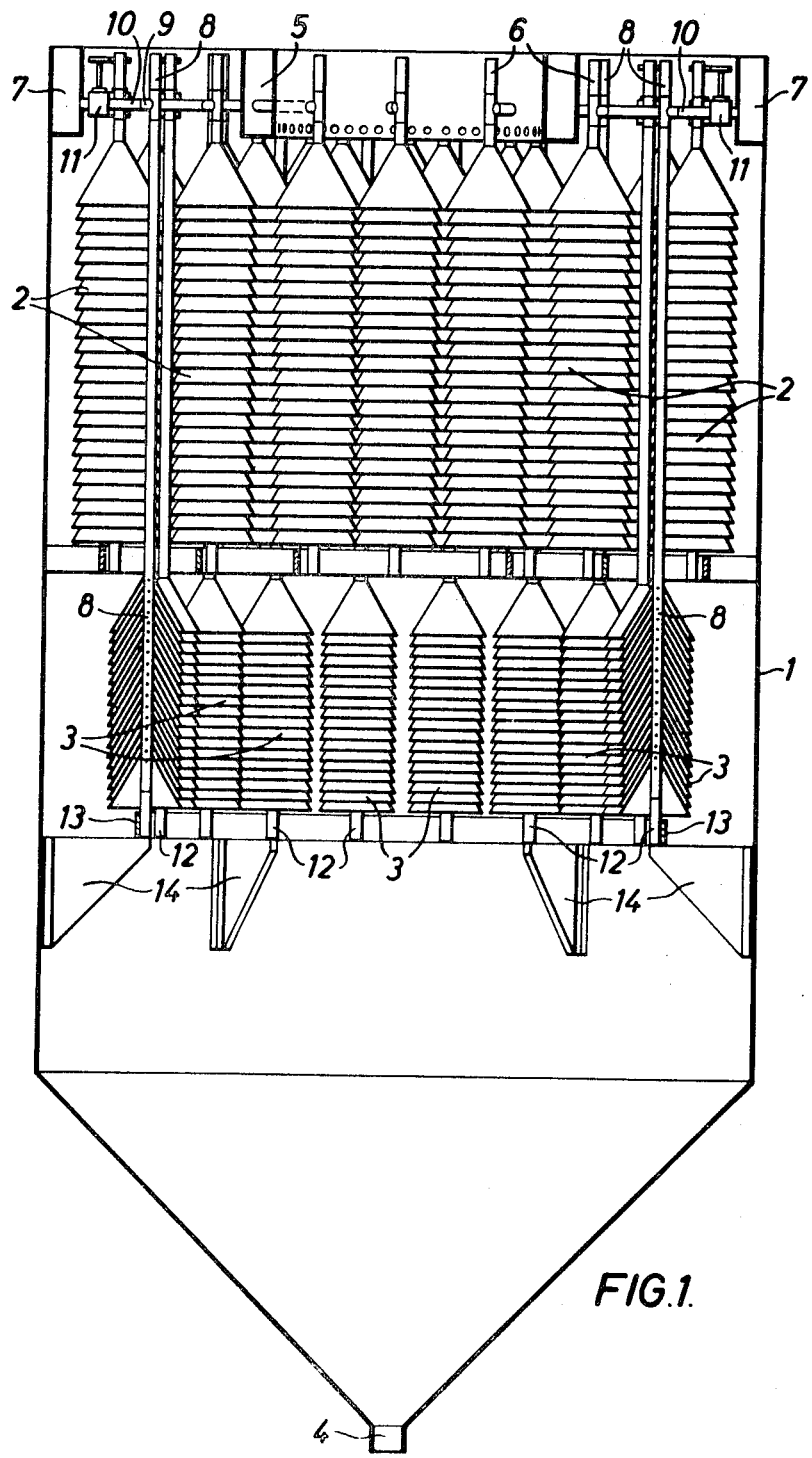

United States Patent [19]

Bach

[11] 3,718,257
[45] Feb. 27, 1973

[54] PROCESS AND APPARATUS FOR THE CLARIFICATION OF LIQUIDS

[75] Inventor: Niels Breinholt Bach, Vestervig, Denmark

[73] Assignee: Mirrless Watson Company Limited, Kent, England

[22] Filed: June 21, 1971

[21] Appl. No.: 154,750

[30] Foreign Application Priority Data

July 1, 1970 Great Britain.....................31,810/70

[52] U.S. Cl. .......................210/73, 210/84, 210/521
[51] Int. Cl. .............................................B01d 21/04
[58] Field of Search....210/73, 83, 84, 294, 322, 521, 210/522

[56] References Cited

UNITED STATES PATENTS

| 2,314,977 | 3/1943 | Green..............................210/522 X |
| 3,306,456 | 2/1967 | Fromson et al..................210/521 X |

Primary Examiner—John Adle
Attorney—Curtis, Morris & Safford

[57] ABSTRACT

The invention relates to a modified POLY-CELL or "cone tree" clarifyer in which a second series of cone trees is disposed below the normal series to reduce the liquids content of the sludge removed from the sludge zone of the clarifier.

10 Claims, 2 Drawing Figures

PROCESS AND APPARATUS FOR THE CLARIFICATION OF LIQUIDS

This invention relates to the clarification of liquids containing suspended solid matter.

The principal purpose of most industrial sedimentation or settling operations is to clarify the liquid not only in the shortest possible time but also to obtain the settled solid matter in as concentrated a form as possible.

The present invention is of special application in the sugar industry, particularly for clarifying liquids from suspended solids, such, for example, as are encountered in the defecation of cane and beet sugar juices, by a continuous process. Continuous clarification of sugar juices is now commonly carried out in clarifiers of the kind described in the specification of British Pat. No. 635,591. These clarifiers (often referred to as POLY-CELL clarifiers) comprise a settling tank containing a plurality of "cone trees" each consisting of a large number of sharply inclined conical members closely assembled on a central pipe which serves at the same time as the support for the members and as a common discharge of clarified liquid from the shallow superposed settling zones formed between the adjacent cones. Solid matter settles on each of the cones and the provision of the plurality of cones in each tree reduces the path of descent of the solid matter to a fraction of the total depth of liquid undergoing sedimentation in the clarifier. The solid matter settling on the cones drops naturally therefrom while the clarified liquid is withdrawn from the space between each adjacent pair of cones in each cone tree and under the influence of hydrostatic pressure rises in the tubular support of each tree to discharge into a suitably placed collecting vessel. Each cone tree is made up of a large number (e.g. 15 to 30) of superposed conical members providing shallow and bottomless settling zones in which sedimentation takes place at a rapid rate. Each cone tree forms an independent operating unit within the main body of liquid undergoing sedimentation, each unit being independently supplied with liquid to be clarified (from the main body of liquid in the tank), and each cone tree discharging clarified liquid independently of the other cone trees within the tank.

The inclination of the shallow settling zones is so steep that gravity alone causes settling solid matter to move toward the lower end of each settling zone into a common vertical settling channel communicating with each of the superposed shallow settling zones, the solid matter settling through the common vertical settling channel accumulating in a sludge bottom below the superposed shallow settling zones, whence sludge may be withdrawn in a substantially continuous manner.

Due to the high settling rate which is characteristic of a POLY-CELL clarifier it has been found necessary to make the volume of the sludge-collecting zone or sludge bottom of the settling tank a relatively large proportion of the total volume of the tank (typically around 50 percent of the tank volume) and unless one is prepared to process a thin sludge (or mud) action must be taken to thicken the sludge in the sludge bottom of the tank before it is withdrawn from the tank. Attempts have been made to achieve a thickening of the sludge by the use of slowly rotating paddles, chains or the like in the sludge bottom (with or without the addition of sludge-collecting trays spaced from the bottom of the tank) but heretofore no satisfactory method has been found for thickening the sludge while still within the tank to a level which makes it acceptable for easy further processing. Attempts have been made to extend the cone trees but in practice there is a limit to the length of a cone tree and if this length is exceeded unsatisfactory operation results.

This disadvantage of a POLY-CELL clarifier is a real one which has evaded solution for over two decades and has been tolerated only because no more efficient clarifier has been developed.

I have now found that by the simple expedient of employing a further set of cone trees located in the settling tank below the level of the conventional (or primary) cone trees in a POLY-CELL tank the aforementioned disadvantage can be overcome and the sludge can be discharged from the tank with a higher concentration of solids content than has heretofore been possible.

According to one aspect of the invention a continuous process of clarifying a liquid containing suspended solid matter in which liquid to be clarified is introduced into a clarifying tank and clarified liquid and sludge are withdrawn therefrom in a substantially continuous manner, settling of solid matter taking place simultaneously in a first series of shallow steeply inclined and closely superposed primary settling zones formed by conical members mounted upon a central pipe and inclined downwardly and outwardly therefrom, the inclination of said primary settling zones being so steep that gravity alone causes settling solid matter to move toward the lower end of each primary settling zone into a vertical settling channel communicating with each of the superposed shallow primary settling zones, clarified liquid simultaneously being withdrawn from near the top of each of said superposed shallow primary settling zones through apertures in the said central pipe, the solid matter settling to the bottom of the vertical settling channel being collected in a sludge zone below the superposed shallow primary settling zones, and the sludge being withdrawn from the sludge zone, is characterized in that a further supply of clarified liquid is separately withdrawn from the liquid in the tank from levels below that of the lowermost primary settling zones but above that at which the sludge is withdrawn from the sludge zone by settling further solid matter from liquid in a lower part of the tank in a second series of shallow, steeply inclined and closely superposed secondary settling zones also formed by conical members mounted upon a separate central pipe and inclined downwardly and outwardly therefrom, the inclination of said secondary settling zones being so steep that gravity alone causes settling solid matter to move toward the lower end of each secondary settling zone into a further vertical settling channel communicating with each of the superposed shallow secondary settling zones and withdrawing the further supply of clarified liquid from near the top of each of said superposed shallow secondary settling zones through apertures in said separate central pipe.

Conveniently said further settling channel is displaced transversely of the tank relative to the first-mentioned settling channel whereby said separate central pipe can pass through the first settling channel defined by the primary settling zones.

According to a further feature of the invention a clarifier comprises a tank having means for supplying liquid to be clarified near its top and a sludge-collecting bottom with means for withdrawing sludge therefrom, a set of separate primary settling units (cone trees) adapted to be operatively positioned within an upper part of the tank and individually removed therefrom, and a set of separate secondary settling units adapted to be operatively positioned within a lower part of the tank below the primary set but above the sludge-collecting bottom and individually removed therefrom, each settling unit comprising a multiplicity of sharply inclined conical members mounted upon a central pipe in closely spaced superposed relation, the inclination of said members being outwardly and downwardly with respect to the associated central pipe with the outer peripheries of the members terminating short of the tank wall (when operatively positioned therein) to provide a vertical settling channel surrounding the superposed members of each settling unit, the central pipe of each settling unit having openings intermediate the apexes of each pair of adjacent conical members mounted thereon, and means for withdrawing clarified liquid from said central pipes when the settling units are operatively positioned within the tank.

The central pipes of the primary set of settling units may lead into the same collecting vessel as the central pipes of the secondary set of settling units.

Conveniently the sludge-collecting bottom of the tank is of frusto-conical shape sloping downwardly to a central outlet for sludge, the tank including a movable scraper (e.g. a chain) which removes sludge from the sloping wall of the sludge-collecting bottom and encourages it to fall into the outlet.

Preferably the secondary set of settling units are positioned relative to the primary set so that the central pipes of each can run vertically up through the tank. Normally the settling units in the secondary set would be shorter than the settling units in the primary set (i.e. they would be constructed from a smaller number of conical members) and may also, with advantage, be of smaller cross-sectional size, in planes normal to the central pipe.

Preferably each central pipe is open at the top (at a level above the normal liquid level in the tank) and is provided with a valve-controlled outlet extending from the pipe a short distance below the open top.

Conveniently the number and size of the settling units in the secondary set is such that the liquids content of the liquid/sludge suspension at the level of the bottom of the settling units of the primary set compared with the liquids content of the suspension at the level of the bottom of the settling units of the secondary set is reduced by a factor of about 2.

Figure 2:
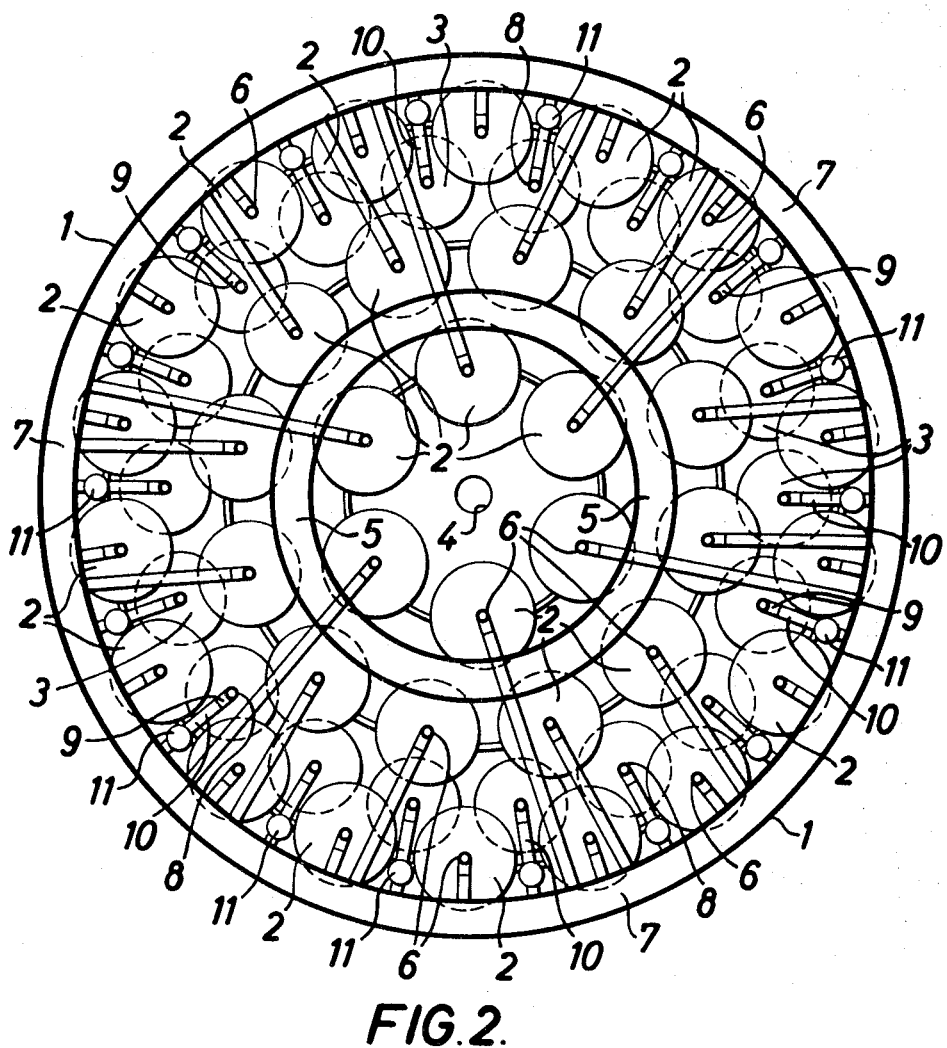

The invention will now be described, by way of example, with reference to the accompanying drawings, in which:

FIG. 1 is a sectional side elevation of a clarifier in accordance with the invention, and FIG. 2 is a plan from above of the clarifier of FIG. 1.

The clarifier shown in the drawings comprises a tank 1 having a cylindrical upper portion (in which primary cone trees 2 and secondary cone trees 3 are located) and a frusto-conical lower or sludge-collecting portion. The bottom of the tank forms an outlet 4 for sludge and the top of the tank includes a launder 5 from which liquid to be clarified can be introduced gently into the tank.

There are 36 primary cone trees 2 in three concentric rings each primary cone tree consisting of 24 conical members spaced 3 inches apart along a central pipe 6. The maximum diameter of each conical member in a primary cone tree is eighteen inches. The pipes 6 of the primary cone trees are perforated between adjacent conical members and each pipe leads into an annular well 7 at the top of the tank 1. The construction of the primary cone trees 2 and their mode of mounting within the tank 1 is wholly conventional and need not be further discussed.

The invention basically resides in the provision of the set of secondary cone trees 3 below the set of primary cone trees 2. These secondary cone trees serve to extract further clarified liquid from the liquid/sludge suspension falling from the vertical annular settling channel which surrounds each primary cone tree before this liquid/sludge suspension reaches the bottom of the tank 1.

In the illustrated embodiment (which is intended to be illustrative and not limiting) there are 18 secondary cone-trees each secondary cone tree being formed from 18 conical members having a maximum diameter of 16 inches the conical members of each secondary cone tree being spaced apart 2 ½ inches. The central pipes of the secondary cone trees (shown at 8 in the drawings) pass up between the middle and outer concentric rings of primary cone trees (i.e. they pass through the settling channels of these rings of primary cone trees) and each projects above the normal liquid level in the tank (shown by the chain line in FIG. 1). Adjacent to the top of each pipe 8 (which is open) is a tee-piece 9 from which extends a discharge pipe 10 leading to the well 7. A valve 11 is located in the pipe 10 and serves to shut off the output from the associated secondary cone tree.

The secondary cone trees can be supported in the tank 1 in any convenient manner but in the arrangement illustrated in the drawings, the central pipes 8 rest on vertical supports 12 carried by a circular band 13 mounted on brackets 14 attached to the cylindrical wall of the tank 1.

The size of the holes formed in the pipes 8 between each pair of adjacent conical members will be determined by experiment but in practice we find they will normally be between five-sixteenths inch and three-eighths inch in diameter.

The apparatus shown in the drawing when employing both primary and secondary cone trees acts to extract 85 percent (by weight) of clarified liquid from the liquid/sludge suspension supplied leaving a thick sludge in the tank bottom which represents 15 percent of the suspension supplied. This sludge is thick enough to be processed directly in a conventional filter plant.

When the secondary set of cone trees is removed (or the valves 11 thereof are shut off) only 70 percent of the suspension supplied is recovered in the well 7 as clarified liquid the remaining 30 percent forming a thin sludge which is difficult to process directly.

While the invention is of special applicability in the clarification of sugar juices, where its advantages and efficiency have been demonstrated, it can equally well be applied to the clarification of any liquid containing suspended solids.

Although the drawing shows cone trees of circular cross-section (i.e. fabricated from circular discs of metal bent into conical form) in some applications pyramidal elements will be preferred (e.g. of three, four or more sides). It will be appreciated that the tank 1 need not be of circular cross-section and that the cross-sectional size of the cone trees can vary between wide limits. In larger tanks (e.g. of 30 to 36 ft. diameter) the individual elements making up the cone trees can have a maximum transverse dimension (i.e. as measured across the open end of the cones) of between 2 and 3 feet. It is also possible to use cone trees of different cross-sectional shapes for the primary and secondary cone trees.

What is claimed is:

1. A continuous process of clarifying a liquid containing suspended solid matter in which liquid to be clarified is introduced into a clarifying tank and clarified liquid and sludge are withdrawn therefrom in a substantially continuous manner, settling of solid matter taking place simultaneously in a first series of shallow steeply inclined and closely superposed primary settling zones formed by conical members mounted upon a central pipe and inclined downwardly and outwardly therefrom, the inclination of said primary settling zones being so steep that gravity alone causes settling solid matter to move toward the lower end of each primary settling zone into a vertical settling channel communicating with each of the superposed shallow primary settling zones, clarified liquid simultaneously being withdrawn from near the top of each of said superposed shallow primary settling zones through apertures in the said central pipe, the solid matter settling to the bottom of the vertical settling channel being collected in a sludge zone below the superposed shallow primary settling zones, and the sludge being withdrawn from the sludge zone, characterized in that a further supply of clarified liquid is separately withdrawn from the liquid in the tank from levels below that of the lowermost primary settling zones but above that at which the sludge is withdrawn from the sludge zone by settling further solid matter from liquid in a lower part of the tank in a second series of shallow, steeply inclined and closely superposed secondary settling zones also formed by conical members mounted upon a separate central pipe and inclined downwardly and outwardly therefrom, the inclination of said secondary settling zones being so steep that gravity alone causes settling solid matter to move toward the lower end of each secondary settling zone into a further vertical settling channel communicating with each of the superposed shallow secondary settling zones and withdrawing the further supply of clarified liquid from near the top of each of said superposed shallow secondary settling zones through apertures in said separate central pipe.

2. A process as claimed in claim 1, in which said further settling channel is displaced transversely of the tank relative to the first-mentioned settling channel whereby said separate central pipe passes through the first settling channel defined by the primary settling zones.

3. A process as claimed in claim 1 in which the number and size of the settling units in the secondary set is such that the liquids content of the liquid/sludge suspension at the level of the bottom of the settling units of the primary set compared with the liquids content of the suspension at the level of the bottom of the settling units of the secondary set is reduced by a factor of about 2.

4. A clarifier comprising a tank having means for supplying liquid to be clarified near its top and a sludge-collecting bottom with means for withdrawing sludge therefrom, a set of separate primary settling units adapted to be operatively positioned within an upper part of the tank and individually removed therefrom, and a set of separate secondary settling units adapted to be operatively positioned within a lower part of the tank below the primary set but above the sludge-collecting bottom and individually removed therefrom, each settling unit comprising a multiplicity of sharply inclined conical members mounted upon a central pipe in closely spaced superposed relation, the inclination of said members being outwardly and downwardly with respect to the associated central pipe with the outer peripheries of the members terminating short of the tank wall, when operatively positioned therein, to provide a vertical settling channel surrounding the superposed members of each settling unit, the central pipe of each settling unit having openings intermediate the apexes of each pair of adjacent conical members mounted thereon, and means for withdrawing clarified liquid from said central pipes when the settling units are operatively positioned within the tank.

5. A clarifier as claimed in claim 4, in which the central pipes of the primary set of settling units lead into the same collecting vessel as the central pipes of the secondary set of settling units.

6. A clarifier as claimed in claim 4 in which the sludge-collecting bottom of the tank is of frusto-conical shape sloping downwardly to a central outlet for sludge, the tank including a movable scraper which removes sludge from the sloping wall of the sludge-collecting bottom and encourages it to fall into the outlet.

7. A clarifier as claimed in claim 4, in which the secondary set of settling units are positioned relative to the primary set so that the central pipes of each run vertically up through the tank.

8. A clarifier as claimed in claim 4, in which the settling units in the secondary set are shorter than the settling units in the primary set.

9. A clarifier as claimed in claim 8, in which the settling units in the secondary set are of smaller cross-sectional size, in planes normal to the central pipe, than the settling units of the primary set.

10. A clarifier as claimed in claim 4, in which each central pipe is open at the top at a level above the normal liquid level in the tank and is provided with a valve-controlled outlet extending from the pipe a short distance below the open top.

* * * * *